(12) United States Patent
Heppe

(10) Patent No.: US 11,884,201 B1
(45) Date of Patent: Jan. 30, 2024

(54) TARP WITH INTEGRATED RIGID STRAPS FOR A MOVABLE CARGO HOLD

(71) Applicant: Ben Heppe, Inyokern, CA (US)

(72) Inventor: Ben Heppe, Inyokern, CA (US)

( * ) Notice: Subject to any disclaimer, the term of this patent is extended or adjusted under 35 U.S.C. 154(b) by 0 days.

(21) Appl. No.: 17/900,682

(22) Filed: Aug. 31, 2022

Related U.S. Application Data

(60) Provisional application No. 63/239,073, filed on Aug. 31, 2021.

(51) Int. Cl.
*B60P 7/04* (2006.01)

(52) U.S. Cl.
CPC ..................... *B60P 7/04* (2013.01)

(58) Field of Classification Search
CPC ...... B60P 7/04; B60P 7/00; B60P 7/02; B60P 7/0876; B60J 7/185; B60J 7/104; B60J 7/102; B60J 7/10; B60J 11/04
USPC ............ 296/100.15, 100.11, 100.12, 100.13, 296/100.14, 100.16, 100.17, 100.18, 296/100.01, 136, 98; 294/1.1, 152
See application file for complete search history.

(56) References Cited

U.S. PATENT DOCUMENTS

| | | | |
|---|---|---|---|
| 4,854,630 A | 8/1989 | Biancale | |
| 5,050,924 A | 9/1991 | Hansen | |
| 6,003,929 A * | 12/1999 | Birdsell | B60P 7/0876 52/3 |
| 6,224,139 B1 * | 5/2001 | Weyand | B60J 7/104 296/100.18 |
| 6,338,521 B1 | 1/2002 | Henning | |
| 6,419,432 B1 | 7/2002 | Chou | |
| 6,851,903 B1 | 2/2005 | Foggy | |
| 7,229,121 B2 | 6/2007 | Fox et al. | |
| 7,448,836 B2 | 11/2008 | Clarke et al. | |
| 7,658,578 B1 | 2/2010 | Weibl | |
| 8,277,156 B2 | 10/2012 | Kinley | |
| 8,292,559 B1 | 10/2012 | Foggy | |
| 8,425,995 B2 * | 4/2013 | Shook | B65F 1/00 53/461 |
| 8,439,422 B2 * | 5/2013 | Ricks, Jr. | B60P 7/0876 296/98 |
| 8,807,894 B2 * | 8/2014 | Bistuer | B64D 9/00 410/97 |
| 9,327,754 B2 * | 5/2016 | Mastromatto | B65D 33/06 |
| 2008/0296186 A1 * | 12/2008 | Daun | B60J 7/104 206/338 |

(Continued)

*Primary Examiner* — Amy R Weisberg
*Assistant Examiner* — Veronica M Shull
(74) *Attorney, Agent, or Firm* — John Rizvi; John Rizvi, P.A—The Patent Professor®

(57) ABSTRACT

A tarp for a movable cargo hold has a tarp fabric comprising a proximal end and a distal end. At least three nylon straps extend across the tarp fabric. Each of the at least three nylon straps comprise a proximal end, a middle portion, and a distal end. A first set of at least two rigid straps covers the proximal end of the at least three nylon straps. A second set of at least two rigid straps covers the distal end of the at least three nylons straps. Openings on each of the at least two rigid straps, the proximal end and distal end of the tarp fabric, and the proximal and distal end of the at least three nylon straps receive rivets. The rivets distribute forces applied to each of the at least two rigid straps. The at least two rigid straps immobilize the tarp.

20 Claims, 7 Drawing Sheets

(56) References Cited

U.S. PATENT DOCUMENTS

2011/0277883 A1* 11/2011 Noonan ................. B65B 67/04
　　　　　　　　　　　　　　　　　　　　　　　29/428
2022/0348404 A1* 11/2022 Granitz, III ............... B65F 1/10

* cited by examiner

TARP WITH INTEGRATED RIGID STRAPS FOR A MOVABLE CARGO HOLD

CROSS-REFERENCE TO RELATED APPLICATIONS

This application claims the benefit of U.S. Provisional Patent Application Ser. No. 63/239,073 filed on Aug. 31, 2021, which is incorporated by reference herein in its entirety.

FIELD OF THE DISCLOSURE

The present disclosure relates generally to tarps, and more particularly, to a tarp spanning across any movable cargo hold and acting as a tonneau cover for the movable cargo hold.

BACKGROUND OF THE DISCLOSURE

Tarps, also known as tarpaulins, are large sheets used to protect people and objects from wind, rain, and sunlight. For example, tarps may be used during construction to protect partially built or damaged structures, to contain or collect debris, to form shelters such as tents, and to protect the loads of open trucks, wagons, and other vehicles.

Tarps may comprise a water-resistant or waterproof material, a color, and grommets. The water-resistant or waterproof material may comprise polyethylene, canvas, vinyl, variations thereof, and combinations thereof. The color of a tarp may correspond to a thickness of the tarp. For example, a blue tarp may have a thickness of 0.13-0.15 mm, a yellow tarp or an orange tarp may have a thickness of 0.18-0.20 mm, a green tarp may have a thickness of 0.23-0.25 mm, a silver tarp may have a thickness of 0.28-0.30 mm, and a brown tarp may have a thickness of at least 0.40 mm. The grommets can be located at corners and sides of the tarp and may allow rope to suspend or tie down the tarp. The grommets may also reinforce openings found in the tarp and may prevent tearing of the tarp.

When loaded with cargo, debris, or trash (collectively, "cargo"), a movable cargo hold may then transport the cargo. Trucks and trailers may be commonly used to transport the cargo over short or long distances. Not all trucks and trailers comprise an enclosed cargo holder. As an example, the bed of a truck can be open to the elements, such as rain, snow, sun, wind, etc. The cargo in an open cargo hold of a vehicle can become wet, be heated by the sun, or blow away. Tarping the cargo hold can reduce the damage caused by the elements on the cargo stored in the hold.

In some applications, trucks and trailers with closed cargo holds may be in limited supply. In other applications, the tarp may require a user to climb on the side of the truck or trailer. Installing the tarp may be difficult and tedious, depending on the load configuration of the automobile and the cargo stored in the automobile. Tarps may also require users to install additional hardware into the cargo hold at significant costs, because the cargo hold may not be manufactured to fit the tarp. Users may spend a long period of time figuring out how to cover the cargo and may even forgo using tarps, resulting in cargo falling from the cargo hold and onto roads. Even if tarps can be successfully installed, wind may cause the tarp to bunch or to loosen the rope tied to the grommet. Users may then have to stop moving in order to fix the conventional tarp.

Wind can cause a conventional tarp to bunch or to loosen the rope tied to the grommet. If the rope or strap holding the tarp to the movable cargo hold becomes loose or unfastened from the cargo hold, the tarp may flap in the wind and damage the cargo hold, vehicle, or nearby vehicles. Also, if the tarp does not fully cover the cargo in the cargo hold, the cargo not covered by the tarp may blow out of the cargo hold or become damaged by the elements. Users may then have to stop and fix the conventional tarp.

Accordingly, there is need for a solution to at least one of the aforementioned problems. For instance, there is an established need for a tarp that covers multiple types of movable cargo holds, can be installed in a short period of time, and stays in place after installed, particularly when the movable cargo hold is in motion.

SUMMARY OF THE DISCLOSURE

The present disclosure is directed to a tarp for a movable cargo hold. The tarp may comprise a tarp fabric. The tarp fabric may have a proximal end and a distal end. The tarp fabric may have openings located at the proximal end of the tarp fabric and the distal end of the tarp fabric that may receive rivets. At least three nylon straps may extend across the tarp fabric. Each of the at least three nylon straps may have a proximal end, a middle portion, and a distal end. The proximal ends of the at least three nylon straps may be located at the proximal end of the tarp fabric. The distal ends of the at least three nylon straps may be located at the distal end of the tarp fabric. Each of the at least three nylon straps may have openings located at the proximal end and the distal end of each of the at least three nylon straps that may receive rivets. At least two rigid straps may have openings that receive rivets. The rivets can distribute forces that may be applied to the at least two rigid straps. A first set of the at least two rigid straps may cover each of the proximal ends of each of the at least three nylon straps. A second set of the at least two rigid straps may cover each of the distal ends of each of the at least three nylons straps. The at least two rigid straps immobilize the tarp.

In another implementation of the disclosure, the tarp fabric may have a non-movable relationship with a first set of grommets located at the proximal end of the tarp fabric and a non-movable relationship with a second set of grommets located at the distal end of the tarp fabric.

In another implementation of the disclosure, the tarp fabric may have a thickness ranging from 0.13-0.41 mm, though this disclosure is not intended to be limited by the thickness of the tarp fabric 102.

In another implementation of the disclosure, each of the distal ends of each of the at least three nylon straps may have a joint. The joint can have an upper portion, a middle portion, and a lower portion.

In another implementation of the disclosure, a ratchet strap may be located at the middle portion of the joint located at each of the distal ends of each of the least three nylon straps. The ratchet strap may apply a downward pressure to the tarp.

In another implementation of the disclosure, the ratchet strap may have a mechanism that can release the tarp.

In another implementation of the disclosure, a top hook may extend outwardly from each of the proximal ends of each of the at least three nylon straps. The top hook may join to a front part of the movable cargo hold.

In another implementation of the disclosure, a bottom hook may extend outwardly from each of the distal ends of each of the at least three nylon straps. The bottom hook may attach to a bumper of the movable cargo hold.

In another implementation of the disclosure, the top hook and the bottom hook cause the tarp to completely cover a length and a width of a movable cargo hold.

In another implementation of the disclosure, the openings in each of the at least two rigid straps may comprise a leftmost opening and a rightmost opening.

In another implementation of the disclosures, the openings in the proximal and distal ends of the tarp fabric may comprise a leftmost opening and a rightmost opening.

In another implementation of the disclosure, the openings in the proximal and distal ends of each of the at least three nylon straps may comprise a leftmost opening and a rightmost opening.

In another implementation of the disclosure, the leftmost openings and the rightmost openings may receive at least two rivets.

In another implementation of the disclosure, the rivets may distribute axial and compressive pressures.

In another implementation of the disclosure, the rivets may enter openings located on an upper rigid strap and openings located on a lower rigid strap.

In another implementation of the disclosure, each of the rivets can have a rivet head, a rivet body, and a rivet tail. The central chamber of each rivet may enter the opening for the tarp fabric and may enter the opening for each of the at least three nylon straps. The rivet head of each rivet may extend outwardly from the upper rigid strap and the bottom end of each rivet may extend outwardly from the lower rigid strap.

These and other objects, features, and advantages of the present disclosure will become more readily apparent from the attached drawings and the detailed description of the preferred embodiments, which follow.

BRIEF DESCRIPTION OF THE DRAWINGS

The preferred embodiments of the disclosure will hereinafter be described in conjunction with the appended drawings provided to illustrate and not to limit the disclosure, where like designations denote like elements, and in which:

FIG. 2A presents an enlarged view of the bottom portion of the distal end of each of the at least three nylon straps and the ratchet strap illustrated in FIG. 2;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the disclosure as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward a tarp spanning across a movable cargo hold and acting as a tonneau cover for the movable cargo hold. A cargo hold may be any apparatus that functions as a movable container for goods and can accept a cover. A cargo hold may be the bed of a truck, a trailer, a box on wheels, a cart, or any similar apparatus.

Figure 1:
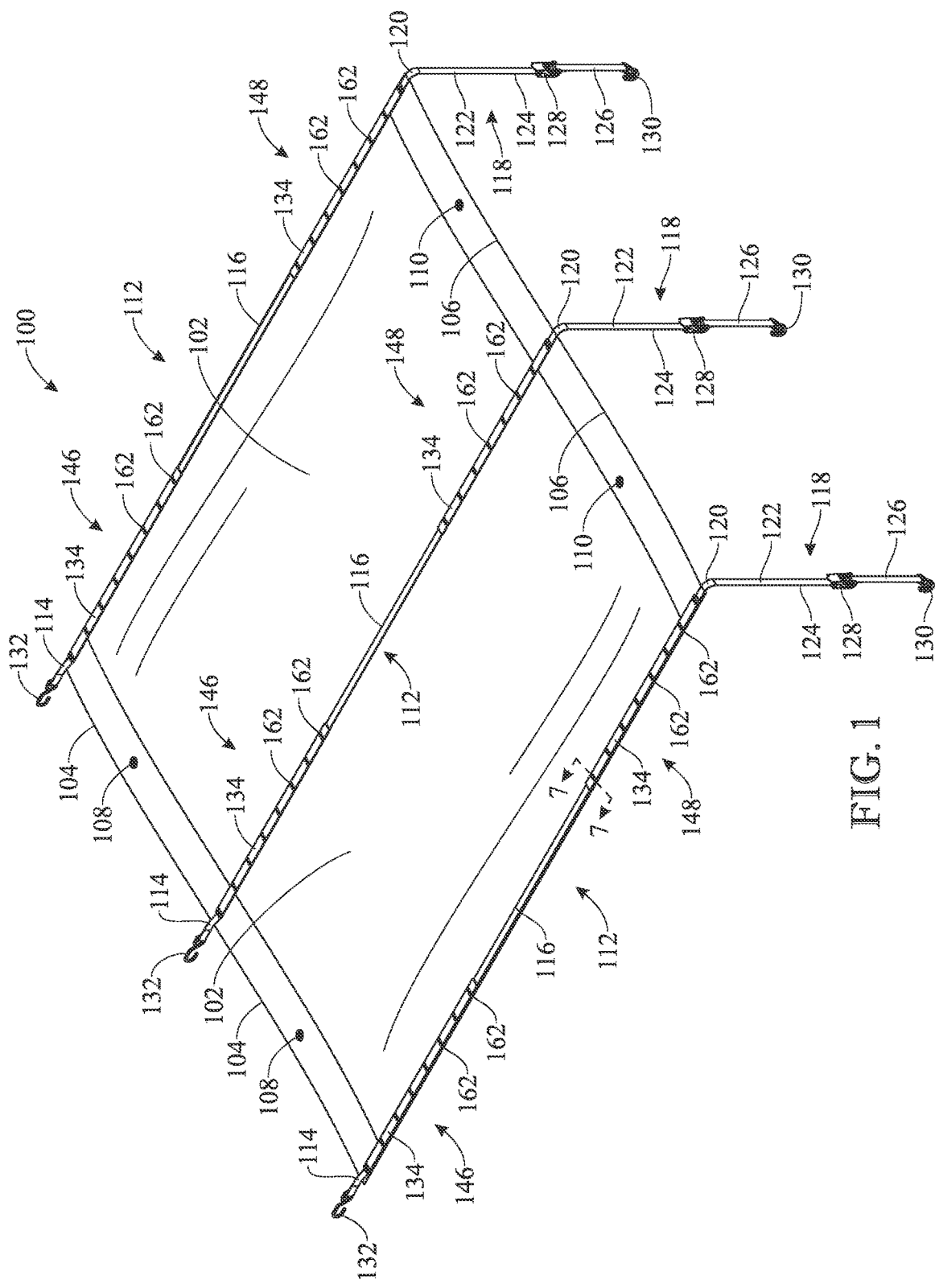
FIG. 1 presents an elevated body view of the tarp in accordance with a first illustrative embodiment of the present disclosure.
Figure 2:
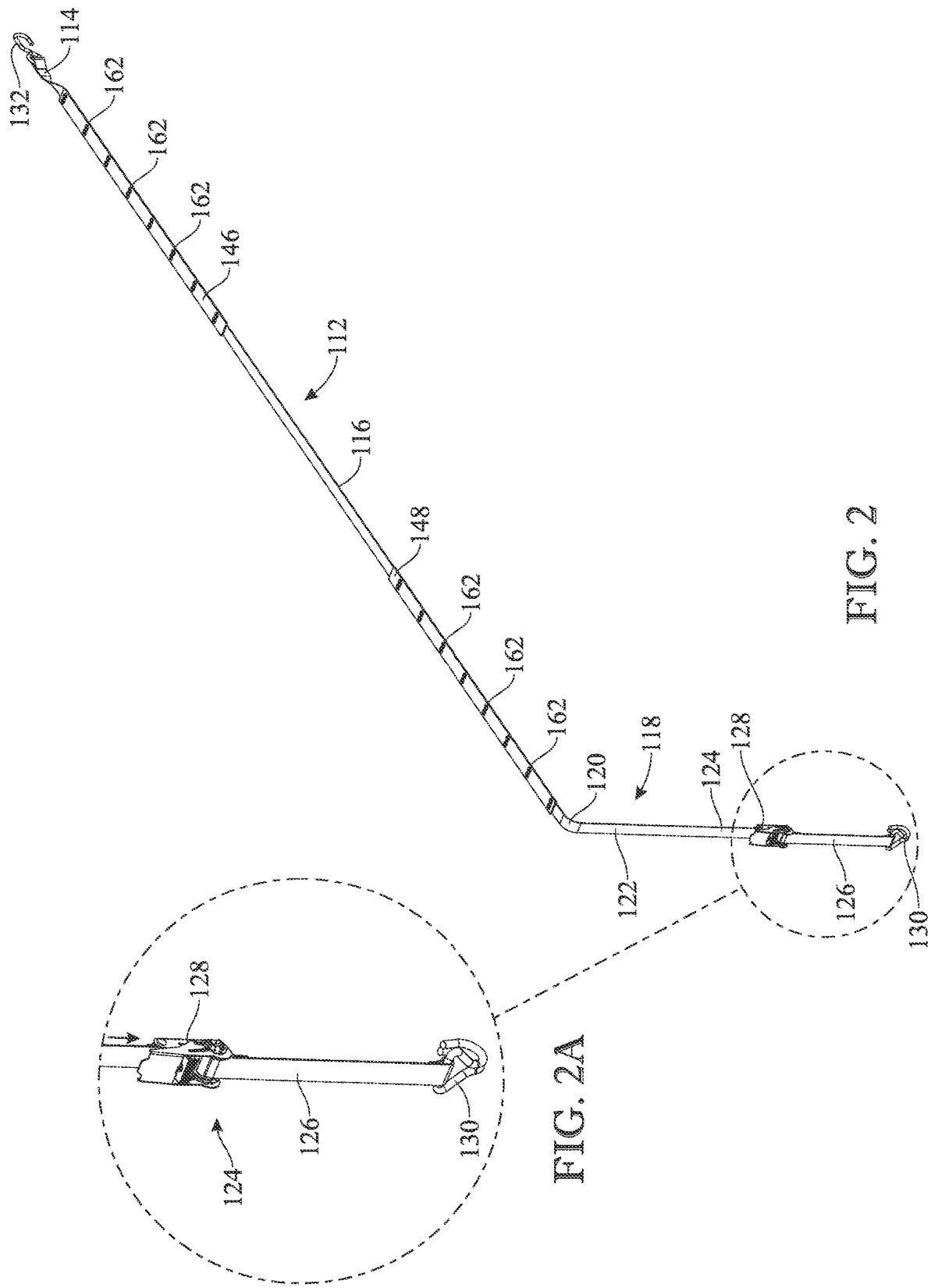
FIG. 2 presents a side view of each of the at least three nylon straps illustrated in FIG. 1.

Referring initially to FIGS. 1-7, a tarp, hereinafter tarp 100, is illustrated in accordance with a first exemplary embodiment of the present disclosure. As seen in FIG. 1, the tarp 100 may include a tarp fabric 102. The tarp fabric 102 can be made of a material that may comprise tarpaulin, polyethylene, canvas, vinyl, variations thereof, or combinations thereof. The tarp fabric 102 may also have a thickness ranging from 0.13-0.41 mm, though this disclosure is not intended to be limited by the thickness of the tarp fabric 102. The tarp fabric 102 can have a proximal end 104 and a distal end 106. A first set of grommets 108 may be located on the proximal end 104 of the tarp fabric 102 and may be in a non-movable relationship with the tarp fabric 102. A second set of grommets 110 may be located on the distal end 106 of the tarp fabric 102 and may be in a non-movable relationship with the tarp fabric 102. In some embodiments, the first set of grommets 108 and the second set of grommets 110 may receive a lashing material, not shown, that can comprise rope, wire, webbing, variations thereof, or combinations thereof. The lashing material, not shown, can engage the first set of grommets 108 and the second set of grommets 110 and can be used to secure the cargo, not shown, to a bottom of a movable cargo hold 176, shown below in FIGS. 4-6. The tarp 100 may cover the movable cargo hold 170, shown below in FIGS. 4-6. The tarp 100 may leave a cavity between the cargo, not shown, that may be located in the bottom of the movable cargo hold 176 and the tarp 100.

Figure 5:
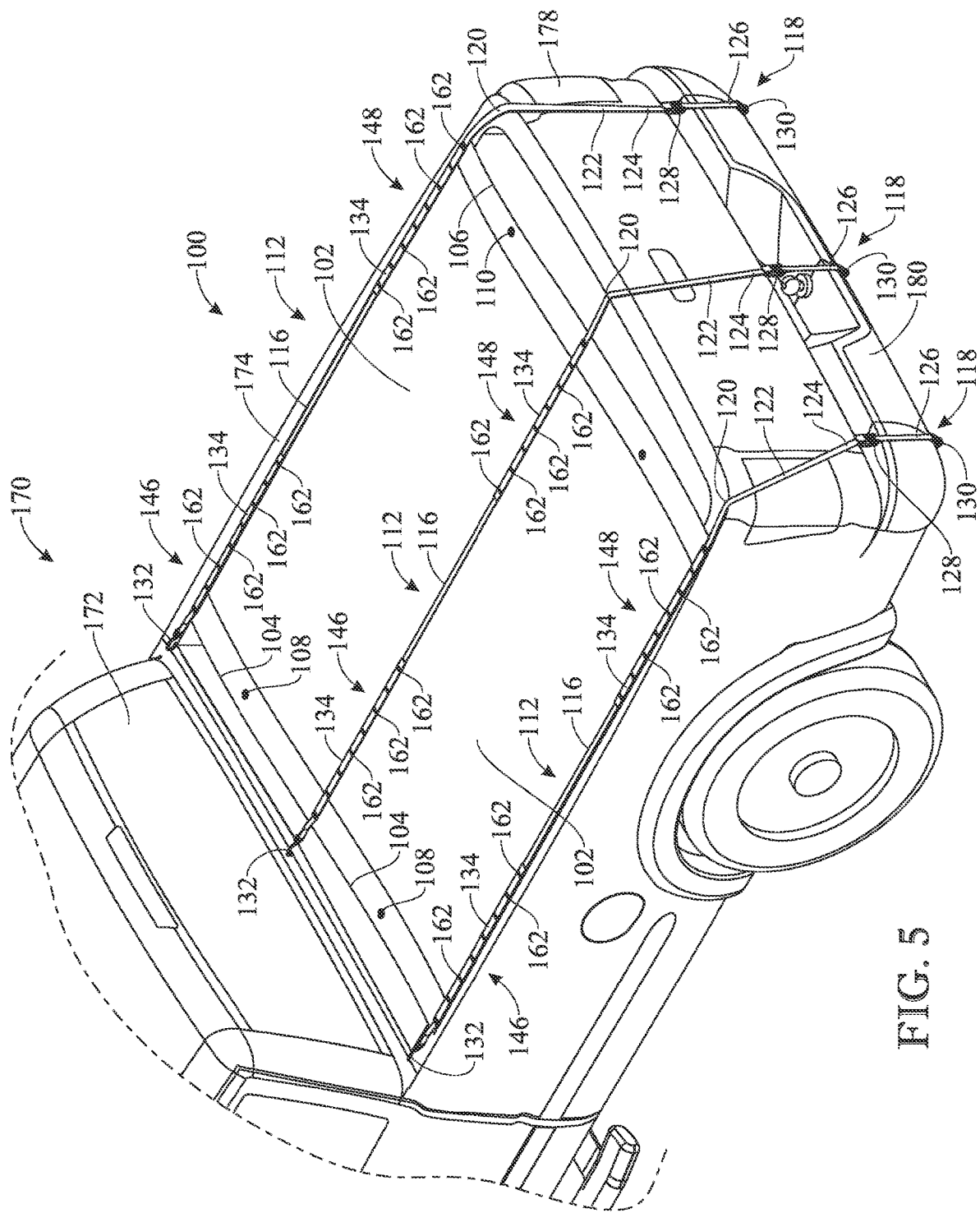
FIG. 5 presents a perspective view of the tarp attached to the movable cargo hold illustrated in FIG. 4, in which top hooks extending outwardly from the proximal end of each of the at least three nylon straps join to a front end of the movable cargo hold and bottom hooks extending outwardly from the distal end of each of the at least three nylon straps join to a bumper of the movable cargo hold.
Figure 6:
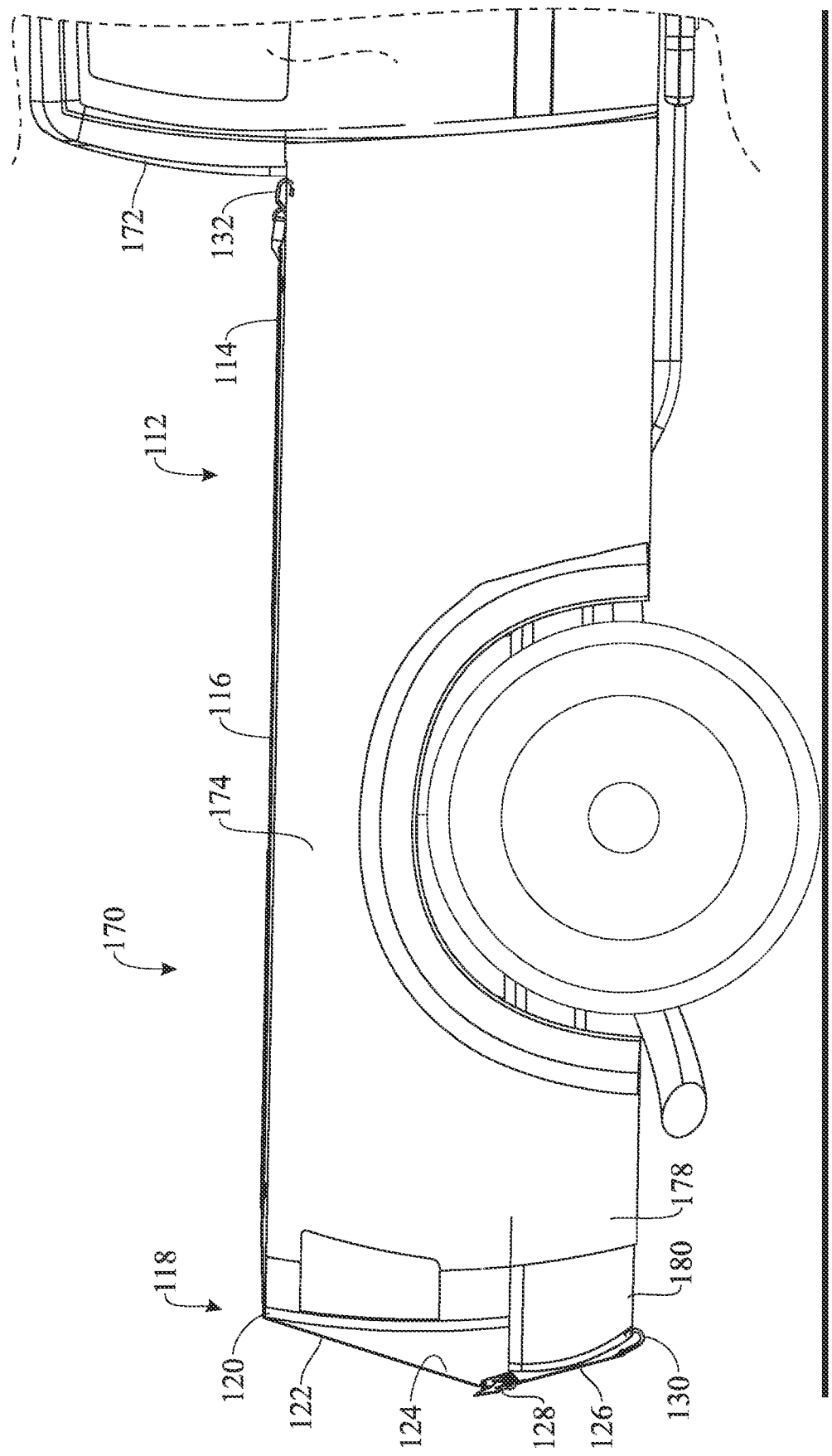
FIG. 6 presents a side portion view of each of the top hooks joined to the front end of the movable cargo hold and of each of the bottom hooks joined to the bumper of the movable cargo hold of FIG. 5.

As illustrated in FIG. 1, the tarp 100 may also have at least three nylon straps 112, and each of the at least three nylon straps 112 may comprise proximal ends 114, middle portions 116, and distal ends 118. The distal ends 118 of the at least three nylon straps 112 can have joints 120. As illustrated in FIGS. 1-6, the joints 120 located at the distal ends 118 of the at least three nylon straps 112 may comprise upper portions 122, middle portions 124, and lower portions 126. As illustrated in FIGS. 1-6, ratchet straps 128 may be located on the middle portions 124 of the joints 120. In some embodiments, the ratchet straps 128 can be parallel with the bottom of movable cargo hold 176 (see FIG. 4). As seen in FIGS. 5-6, the ratchet straps 128 can slide between a body 174 of the movable cargo hold 170 and a bumper 180 located at a back end 178 of the movable cargo hold 170. The ratchet straps 128 can exert downward pressure, not shown, on the tarp fabric 102, which can prevent movement of the cargo, not shown, when the cargo, not shown, is in the bottom of the movable cargo hold 176 (see FIG. 4). The ratchet straps 128 can be joined to a tie down ring, not shown, or to the bumper 180 of the movable cargo hold 170, and can be tightened according to a load configuration of the tarp 100. The tarp 100 may be released by depressing a mechanism, not shown, holding the ratchet straps 128. In some embodiments, eyelets, not shown, can be added to the tarp 100 and can install threaded materials, not shown, on the tarp 100. The threaded materials, not shown, may comprise materials including straps, cords, rope, variations thereof, or combinations thereof. Each of the at least three nylon straps can be made of a material comprising nylon, variants thereof, or combinations thereof.

As illustrated in FIGS. 1-6, bottom hooks 130 may extend outwardly from lower portion 126 of the joints 120 located at the distal ends 118 of the at least three nylon straps 112. The bottom hooks 130 can attach the distal ends 118 of the at least three nylon straps 112 to the bumper 180 of the movable cargo hold 170, shown below in FIGS. 4-6. Top hooks 132 may extend outwardly from the proximal ends 114 of the at least three nylon straps 112. The top hooks 132 can attach the proximal ends 114 of the at least three nylon straps 112 to a front end 172 of the movable cargo hold 170, shown below in FIGS. 4-6. The tarp fabric 102 may be spread across a length and width of the bottom of the movable cargo hold 176 after the top hooks 132 attach to the front end 172 of the movable cargo hold 170.

Figure 3:
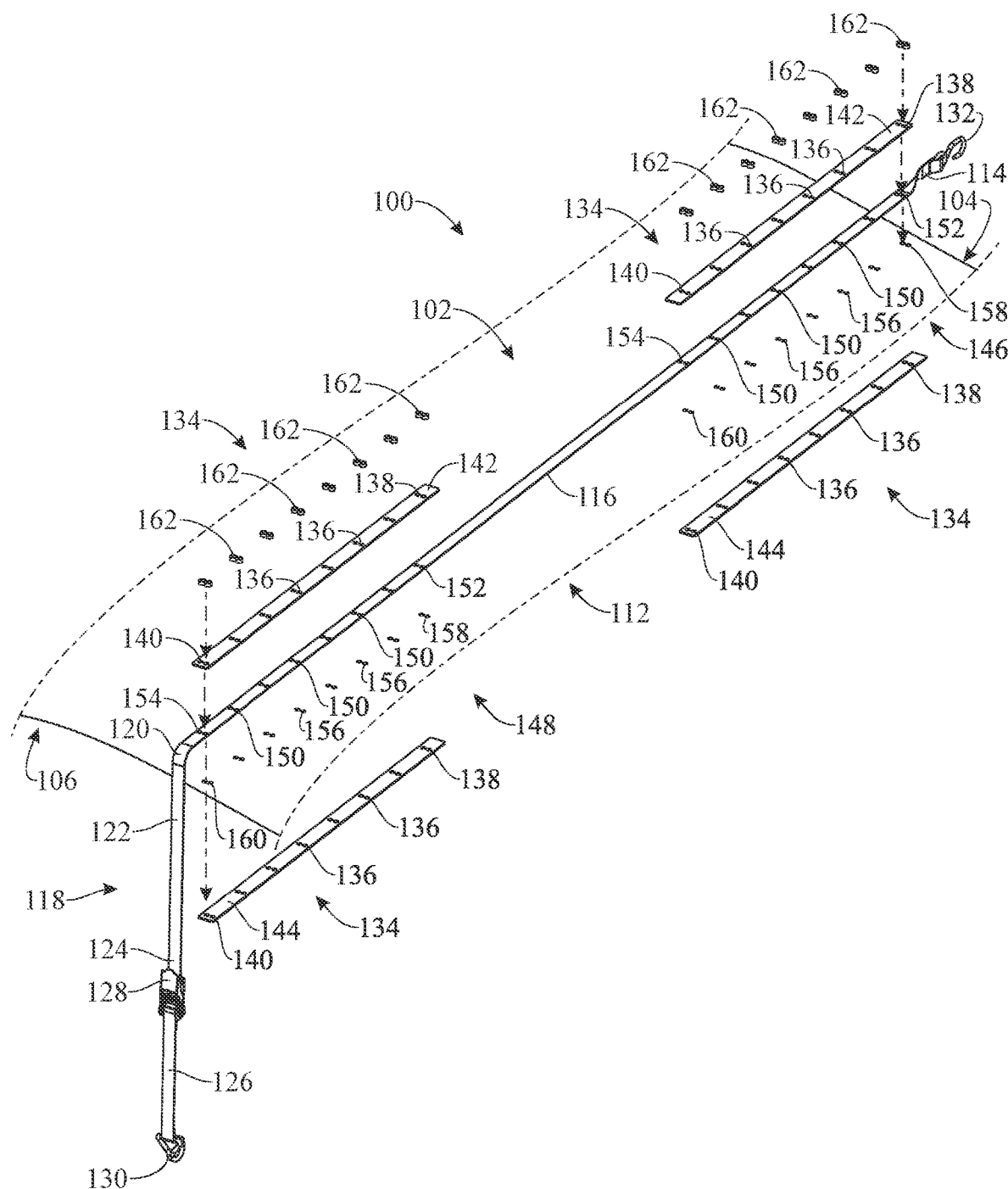
FIG. 3 presents an exploded and reversed view of the rivets entering openings located on an upper rigid strap, openings located on proximal ends and distal ends of each of the at least three nylon straps, openings located on the proximal end and the distal end of the tarp fabric, and openings located on a lower rigid strap.
Figure 4:
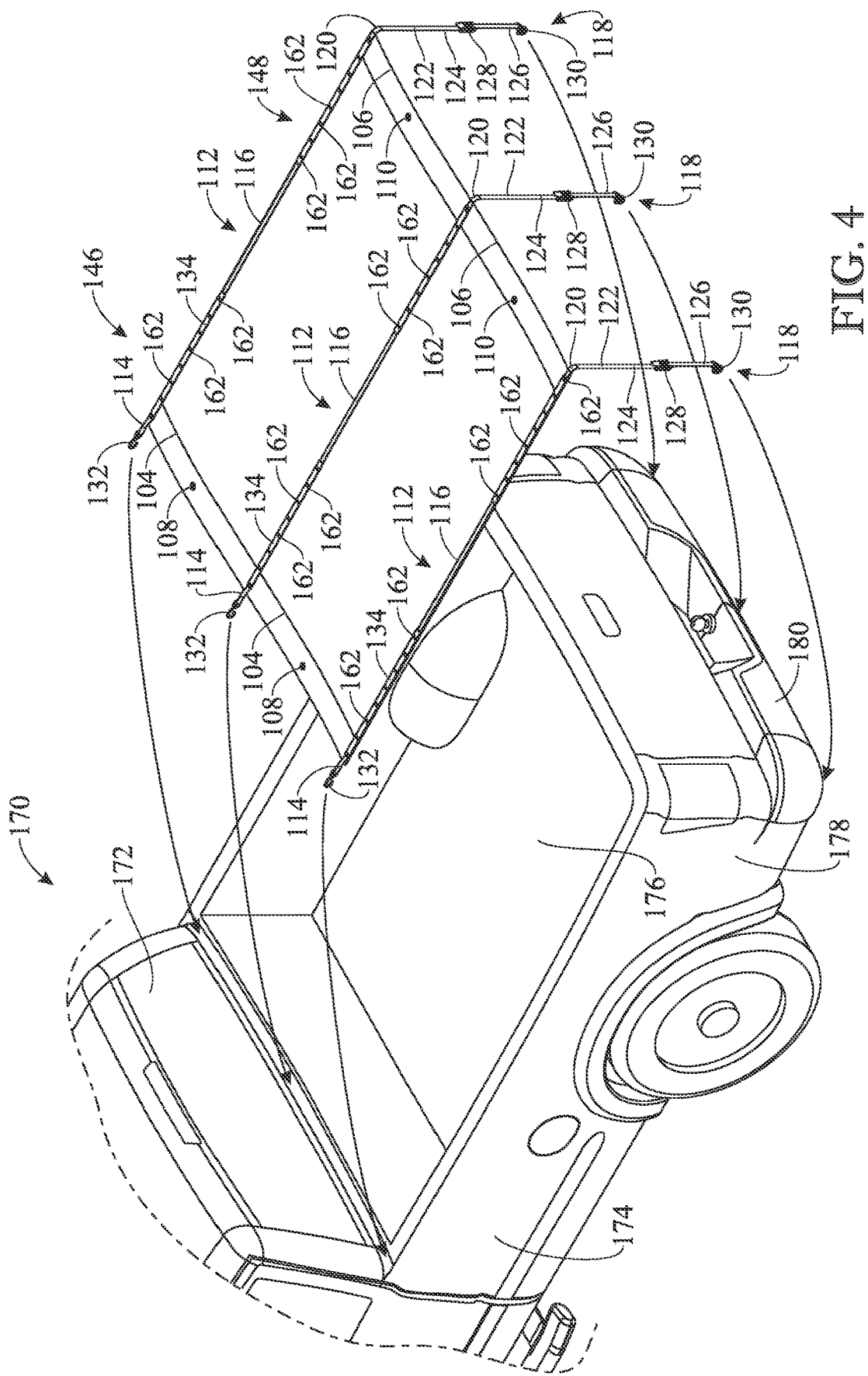
FIG. 4 presents an alternate view of the tarp illustrated in FIG. 1 in which the tarp is attached to a movable cargo hold.
Figure 7:
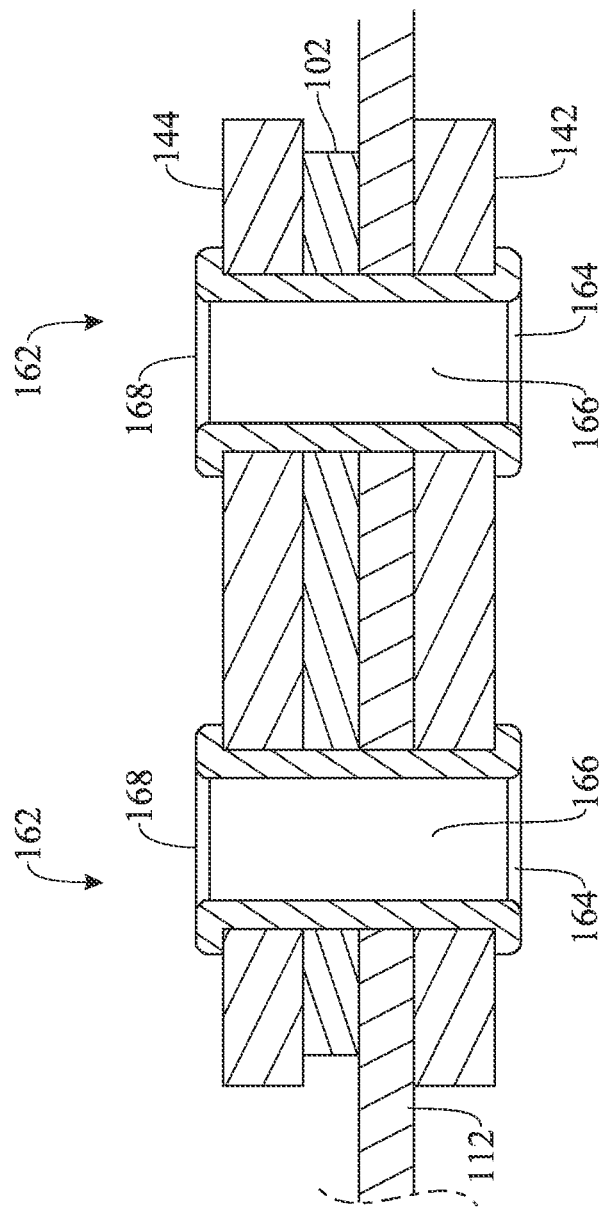
FIG. 7 presents a cross-section view of the rivets after entering the openings found on the lower rigid strap, the tarp fabric, each of the at least three nylon straps, and the upper rigid strap of FIG. 3.

As illustrated in FIGS. 1-5, at least two rigid straps 134 may be fastened to the tarp fabric 102. Each of the at least two rigid straps 134 can have openings 136. In some embodiments, the openings 136 of each of the at least two rigid straps 134 may be bored into each of the at least two rigid straps 134. The at least two rigid straps 134 may be made out of metal or some other durable material In other embodiments, the openings 136 of each of the at least two rigid straps 134 may be machined or formed in each of the at least two rigid straps 134. Each of the openings 136 located on each of the at least two rigid metal straps 134 may be equidistant to subsequent openings 136 located on each of the at least two rigid straps 134 and may matingly engage with rivets 162. In some embodiments and as illustrated in FIG. 3, the openings 136 on each of the at least two rigid straps 134 may comprise a leftmost opening 136 and a rightmost opening 138 on each of the at least two rigid straps 134. In further embodiments and as illustrated in FIG. 3, the leftmost opening 136 and the rightmost opening 138 of the at least two rigid straps can matingly engage with at least two rivets 162. As illustrated in FIGS. 3 and 7, the rivets 162 may matingly engage with the openings 136 located on an upper rigid strap 142 and a lower rigid strap 144. As illustrated in FIGS. 1-6, the at least two rigid straps 134 may comprise a first set of rigid straps 146 located at the proximal ends 114 of the at least three nylon straps 112 and the proximal ends 104 of the tarp fabric 102. As illustrated in FIGS. 1-6, the least two rigid straps 134 may comprise a second set of rigid straps 148 located at the distal ends 118 of the at least three nylon straps 112 and the distal ends 106 of the tarp fabric 102.

As illustrated in FIG. 3, openings 150 may be located on the proximal ends 114 and the distal ends 118 of the at least three nylon straps 112. Each of the openings 150 located on the proximal ends 114 of the at least three nylon straps 112 may be equidistant to subsequent openings 150 located on the proximal ends 114 of the at least three nylon straps 112 and can matingly engage with rivets 162. Each of the openings 150 located on the distal ends 118 of the at least three nylon straps 112 may be equidistant to subsequent openings 150 located on the distal ends 118 of the at least three nylon straps 112 and can matingly engage with rivets 162. In some embodiments, and as illustrated in FIG. 3, the openings 150 located at the proximal ends 114 of the at least three nylon straps 112 may comprise a leftmost opening 152 and a rightmost opening 154. In further embodiments, and as illustrated in FIG. 3, the leftmost opening 152 and the rightmost opening 154 located at the proximal ends 114 of the at least three nylon straps 112 can matingly engage with at least two rivets 162. In some embodiments, and as illustrated in FIG. 3, the openings 150 located at the distal ends 118 of the at least three nylon straps 112 may comprise the leftmost opening 152 and the rightmost opening 154. In further embodiments, and as illustrated in FIG. 3, the leftmost opening 152 and the rightmost opening 154 located at the distal ends 118 of the at least three nylon straps 112 can matingly engage with at least two rivets 162.

As illustrated in FIG. 3, openings 156 may be located on the proximal ends 104 and the distal ends 106 of the tarp fabric 102. Each of the openings 156 located on the proximal ends 104 of the tarp fabric 102 may be equidistant to subsequent openings 156 located on the proximal ends 104 of the tarp fabric 102 and can matingly engage with rivets 162. Each of the openings 156 located on the distal ends 106 of the tarp fabric 102 may be equidistant to subsequent openings 156 located on the distal ends 106 of the tarp fabric 102 and can matingly engage with rivets 162. In some embodiments, and as illustrated in FIG. 3, the openings 156 located at the proximal ends 104 of the tarp fabric 102 may comprise a leftmost opening 158 and a rightmost opening 160. In further embodiments, and as illustrated in FIG. 3, the leftmost opening 158 and the rightmost opening 160 located at the proximal ends 104 of the tarp fabric 102 can matingly engage with at least two rivets 162. In some embodiments, and as illustrated in FIG. 3, the openings 156 located at the distal ends 106 of the tarp fabric 102 may comprise the leftmost opening 158 and the rightmost opening 160. In further embodiments, and as illustrated in FIG. 3, the leftmost opening 158 and the rightmost opening 160 located at the distal ends 106 of the tarp fabric 102 can matingly engage with at least two rivets 162.

As illustrated in FIG. 3 and FIG. 7, each of the rivets 162 may comprise a rivet head 164, a rivet body 166, and a rivet tail 168. The rivet head 164 of each rivet 162 may extend outwardly from the upper rigid strap 142. In some embodiments, the rivet head 164 of each rivet 162 may pass through the opening 136 on the lower rigid strap 144, the opening 156 on the tarp fabric 102, the opening 150 on each of the at least three nylon straps 112, and the opening 136 of the upper rigid strap 142. The rivet tail 168 of each rivet 162 may extend outwardly from the lower rigid strap 144. In some embodiments, the rivet tail 168 of each rivet 162 may pass through the opening 136 on the top rigid strap 142, the opening 150 on each of the at least three nylon straps 112, the opening 156 on the tarp fabric 102 and the opening 136 of the lower rigid strap 144. As illustrated in FIG. 7, the rivet body 166 of each rivet may travel through the opening 150 on each of the at least three nylon straps 112 and the opening 156 on the tarp fabric 102. In some embodiments, the rivet body 166 of each rivet 162 may travel through the opening 136 on the lower rigid strap 144. In alternate embodiments, the rivet body 166 of each rivet 162 may travel through the opening 136 on the top rigid strap 142.

As illustrated in FIGS. 1-6, the at least two rigid straps 134 can be made of a heat-treated material comprising steel, metal, variants thereof or combinations thereof. The first set of rigid straps 146 at the proximal ends 114 of the at least three nylon straps 112 and the proximal ends 104 of the tarp fabric 102 and the second set of rigid straps 148 at the distal ends 118 of the at least three nylon straps 112 and the distal ends 106 of the tarp fabric 102 can recumbently fold the tarp 100. In some embodiments, the tarp may comprise at least two recumbent folds by riveting a third set of rigid straps, not shown, to the middle portion 116 of the at least three nylon straps 112. The first set of rigid straps 146 at the proximal ends 114 of the at least three nylon straps 112 and the proximal ends 104 of the tarp fabric 102 and the second set of rigid straps 148 at the distal ends 118 of the at least three nylon straps 112 and the distal ends 106 of the tarp fabric 102 may be pulled by a user, not shown, to adjust a width of the tarp 100 and match the width of the bottom of the movable cargo hold 176. The mass of the at least two rigid straps 134 may prevent wind, not shown, from bunching the tarp 100 while the movable cargo hold 170 is in motion, not shown. The at least two rigid straps 134 may allow users to spread the tarp 100 across the bottom of the movable cargo hold 176 in an amount of time ranging from 20-120 seconds.

As illustrated in FIGS. 3 and 7, the rivet head 164 of each rivet 162 may transfer axial and compressive pressure, not shown, to the upper rigid strap 142. The rivet tail 168 of each rivet 162 may transfer axial and compressive pressure, not shown, to the lower rigid strap 144. In some embodiments, the at least three nylon straps 112 may have a load rating less than or equal to the rivets 162. The rivets 162 can be made of a resistant material comprising 1100F grade aluminum, variants thereof, or combinations thereof. In some embodiments, the middle portions 116 of the at least three nylon straps 112 may be glued or sewed to the tarp fabric 102.

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the disclosure should be determined by the appended claims and their legal equivalents.

What is claimed is:

1. A tarp for a movable cargo hold, the tarp comprising:
    a tarp fabric with a plurality of corners, a plurality of sides, a proximal end and a distal end, wherein the tarp fabric comprises openings located at the proximal end of the tarp fabric and the distal end of the tarp fabric that receives rivets;
    at least three nylon straps that extend across the tarp fabric, wherein each of the at least three nylon straps comprise a proximal end located at the proximal end of the tarp fabric, a middle portion, and a distal end located at the distal end of the tarp fabric, and further wherein each of the at least three nylon straps comprise openings located at the proximal end of each of the at least three nylon straps and the distal end of each of the at least three nylon straps that receive rivets; and
    at least two rigid straps with openings that receive rivets, the rivets distributing forces applied to the at least two rigid straps, wherein a first set of the at least two rigid straps cover the proximal ends of each of the at least three nylon straps and a second set of the at least two rigid straps cover the distal ends of each of the at least three nylon straps, and further wherein the at least two rigid straps immobilize the tarp.

2. The tarp according to claim 1, wherein the tarp has a thickness of between 0.13 and 0.41 millimeters.

3. The tarp according to claim 1, wherein the tarp further comprises a plurality of sets of grommets.

4. The tarp according to claim 3, wherein a first of the sets of grommets being located on the proximal end of the tarp fabric.

5. The tarp according to claim 4, wherein the first set of grommets having a non-movable relationship with the tarp fabric.

6. The tarp according to claim 4, wherein a second of the sets of grommets being located on the distal end of the tarp fabric.

7. The tarp according to claim 6, wherein the second set of grommets having a non-movable relationship with the tarp fabric.

8. The tarp according to claim 1, wherein the tarp further comprises three straps.

9. The tarp according to claim 8, wherein the three straps are made of a nylon material.

10. The tarp according to claim 8, wherein each of the three straps having a proximal end, a distal end and a middle portion.

11. The tarp according to claim 10, wherein the distal end of each of the three straps having a joint, each of the joints of the distal ends of each of the straps.

12. The tarp according to claim 11, wherein the joint of the distal end of each of the straps having an upper portion, a middle portion, and a lower portion.

13. The tarp according to claim 12, wherein each of the three straps having a rachet, the rachet being coupled to the middle portion of the joint of the distal end of each of the three straps.

14. The tarp according to claim 13, wherein the three straps are parallel with a bottom of the movable cargo hold.

15. The tarp according to claim 14, wherein the rachet of each of the three straps being slidable between a body of the movable cargo hold and a bumper located at a back end of the movable cargo hold.

16. The tarp according to claim 15, wherein the rachet of each of the three straps exerting a downward pressure on the tarp fabric in the bottom of the movable cargo hold.

17. The tarp according to claim 16, wherein the rachet of each of the three straps being joined to the bumper of the movable cargo hold.

18. The tarp according to claim 17, wherein the rachet of each of the three straps can be tightened according to a load configuration of the tarp.

19. The tarp according to claim 18, wherein the tarp being released by depressing a mechanism holding each of the rachet of each of the three straps.

20. The tarp according to claim 1, wherein the tarp further comprises a plurality of eyelets, the eyelets being added to the tarp and the eyelet for added threaded materials.

\* \* \* \* \*